(12) United States Patent
Jung

(10) Patent No.: US 10,659,693 B2
(45) Date of Patent: May 19, 2020

(54) IMAGE PROCESSING DEVICE AND METHOD OF CORRECTING IMAGES

(71) Applicant: HANWHA TECHWIN CO., LTD., Seongnam-si (KR)

(72) Inventor: Gabcheon Jung, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 12 days.

(21) Appl. No.: 15/993,593

(22) Filed: May 31, 2018

(65) Prior Publication Data
US 2019/0222761 A1    Jul. 18, 2019

(30) Foreign Application Priority Data

Jan. 16, 2018   (KR) .................. 10-2018-0005521

(51) Int. Cl.
*H04N 5/232*    (2006.01)
*G06T 7/246*    (2017.01)
*H04N 5/14*    (2006.01)

(52) U.S. Cl.
CPC ......... *H04N 5/23267* (2013.01); *G06T 7/246* (2017.01); *H04N 5/23254* (2013.01); *G06T 2207/10016* (2013.01); *G06T 2207/20021* (2013.01)

(58) Field of Classification Search
CPC . H04N 5/23267; H04N 5/23254; G06T 7/246
See application file for complete search history.

(56) References Cited

U.S. PATENT DOCUMENTS

| 6,047,134 A | 4/2000 | Sekine et al. |
| 9,811,887 B2 | 11/2017 | Shin |
| 2009/0180704 A1* | 7/2009 | Wey .................. G06T 5/50 382/254 |

FOREIGN PATENT DOCUMENTS

| KR | 10-1433472 | 8/2014 |
| KR | 10-2015-0031766 | 3/2015 |

* cited by examiner

*Primary Examiner* — Ahmed A Berhan
(74) *Attorney, Agent, or Firm* — H.C. Park & Associates, PLC

(57) ABSTRACT

An image processing device to correct for wobble of an image constructed according to exemplary embodiments of the invention includes an input interface to communicate with an image capture sensor, and a motion vector detector to process first and second images received from the image sensor through the input interface, to detect, in the first image, feature points having feature values higher than a threshold value, and to compare the first image to the second image by using at least parts of the feature points to determine a global motion vector of the first image. The threshold value is adjustable depending on a gain of the image sensor.

20 Claims, 11 Drawing Sheets

IMAGE PROCESSING DEVICE AND METHOD OF CORRECTING IMAGES

CROSS-REFERENCE TO RELATED APPLICATIONS

This application claims priority from and the benefit of the Korean Patent Application No. 10-2018-0005521, filed on Jan. 16, 2018, which is hereby incorporated by reference for all purposes as if fully set forth herein.

BACKGROUND

Field

Exemplary implementations of the invention relates generally to image capture and processing of images, and more particularly, to image processing devices and methods of correcting images having wobble.

Discussion of the Background

Image capture devices have been increasingly used with the development of electronic cameras and imaging technology, which raises issues of correcting for image wobble (e.g., shaking, blur) when the image is captured by people or environments in which the image capture device may be unintentionally moved, e.g., by the photographer or environmental conditions. Thus, image wobble is generated from various environments, e.g., when a person uses a mobile camera such as a portable digital camera, a smart phone, and the like, due to the person being unsteady, camera shake or the like. In case of an outdoor-installed CCTV, image blur is generated from a weather environment such as rain, wind, and the like, and an in-vehicle black box camera suffers from the image blur generated from a vibration of the vehicle during driving. Commercially available image correction devices or programs suffer from various drawbacks, such as complexity and inaccuracy. Accordingly, there remains a need for imaging processing devices and methods to correct for image wobble in a simple and accurate manner.

The above information disclosed in this Background section is only for enhancement of understanding of the background of the inventive concepts, and, therefore, it may contain information that does not form the prior art that is already known to a person of ordinary skill in the art.

SUMMARY

Devices and methods constructed according to the principles and exemplary implementations of the invention are capable of efficiently correcting for wobble of images taken in various environments. For example, devices methods according to exemplary implementations of the invention correct for wobble with a relatively high degree of reliability even in a dark environment According to one or more exemplary embodiments of the invention, an image processing device to correct for wobble of an image includes: an input interface to communicate with an image capture sensor; and a motion vector detector to process first and second images received from the image sensor through the input interface, to detect, in the first image, feature points having feature values higher than a threshold value, and to compare the first image to the second image by using at least parts of the feature points to determine a global motion vector of the first image, the threshold value being adjustable depending on a gain of the image sensor.

The motion vector detector may be configured to increase the threshold value as the gain of the image sensor increases.

The threshold value may be a first value when the gain of the image sensor is lower than a first level, the threshold value may be a second value higher than the first value when the gain of the image sensor is higher than a second level that is higher than the first level, and the threshold value may increase between the first value and the second value as the gain of the image sensor increases when the gain of the image sensor is between the first level and the second level.

The feature values may be contrast levels.

The first image may include a plurality of sub blocks. The motion vector detector may be configured to detect feature point candidates in the plurality of sub blocks, respectively, and to select one or more of the feature point candidates having feature values higher than the threshold value as the feature points.

The image processing device may further include an image stabilizer to correct the first image in response to a signal from the global motion vector.

The motion vector detector may be configured to generate signals representative of local motion vectors of feature point groups of the first image by comparing them to the second image, and to generate signals representative of the global motion vector based upon the local motion vectors, and wherein the feature point groups are defined by grouping the at least parts of the feature points.

The motion vector detector may be configured to adjust the number of feature points included in each of the feature points groups depending on the gain of the image sensor.

The number of feature points included in each of the feature points may increase as the gain of the image sensor increases.

The number of feature points may be a first value when the gain of the image sensor is lower than a first level, the number of feature points may be a second value higher than the first value when the gain of the image sensor is higher than a second level that is higher than the first level, and the number of feature points may increase between the first value and the second value as the gain of the image sensor increases when the gain of the image sensor is between the first level and the second level.

According to one or more exemplary embodiments of the invention, a method for correcting wobble in an image includes the steps of: receiving first and second images from an image sensor; receiving a gain of the image sensor; detecting, in the first image, feature points having feature values higher than a threshold value; and comparing the first image to the second image by using at least parts of the feature points to generate signals to correct for the wobble of the first image. The threshold value is adjustable depending on the gain of the image sensor.

The threshold value may increase as the gain of the image sensor increases.

The step of comparing the first image to the second image may include: defining feature point groups by grouping the at least parts of the feature points; generating signals representative of local motion vectors of the feature point groups of the first image by comparing to the second image; and generating signals representative of a global motion vector of the first image based upon the local motion vectors.

The number of feature points included in each of the feature points group may be adjusted depending on the gain of the image sensor.

The number of feature points included in each of the feature points may increase as the gain of the image sensor increases.

According to another exemplary embodiment of the invention, an image processing device to correct for wobble in an image includes: an input interface to communicate with an image sensor; and a motion vector detector to receive first and second images from the image sensor through the input interface, and to generate signals representative of a global motion vector of the first image based upon local motion vectors of feature point groups of the first image by comparing them to the second image, the feature point groups being defined by grouping at least parts of feature points included in the first image. The motion vector detector is configured to adjust the number of feature points included in each of the feature point groups depending on a gain of the image sensor.

The number of feature points included in each of the feature point groups may increase as the gain of the image sensor increases.

The feature points included in the first image may have feature values higher than a threshold value, the threshold value may increase as the gain of the image sensor increases.

The first image may include a plurality of sub blocks, and the motion vector detector may be configured to detect feature point candidates in the plurality of sub blocks, respectively, and to select one or more of the feature point candidates having feature values higher than the threshold value as the feature points included in the first image.

The threshold value may increase as the gain of the image sensor increases.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 5A is a schematic diagram for illustrating feature point candidates that are detected in a target image.

FIG. 5B is a schematic diagram for illustrating feature points selected from the feature point candidates.

DETAILED DESCRIPTION OF THE ILLUSTRATED EMBODIMENTS

Figure 1:
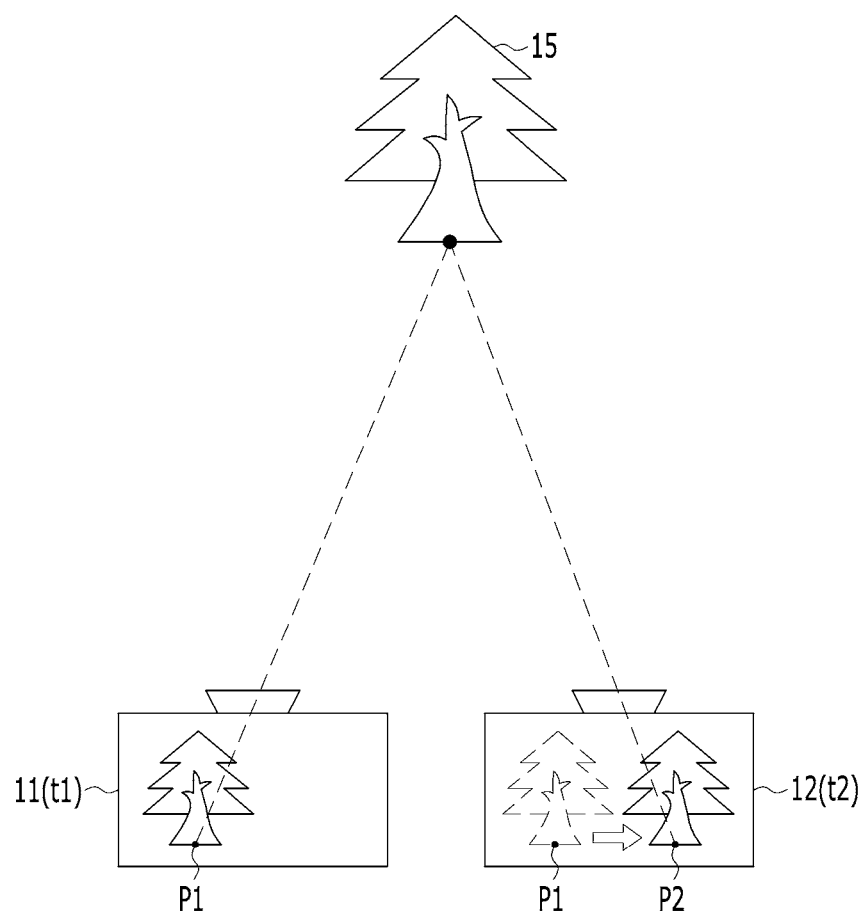
FIG. 1 is a conceptual view for schematically illustrating the distortion in images captured by an image capturing device when the image capturing device is wobbled.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In exemplary embodiments, an image processing device, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the image processing device, and/or one or more components thereof may include or otherwise be associated with one or more memories (not shown) including code (e.g., instructions) configured to cause the image processing device, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a conceptual view for schematically illustrating the distortion in images captured by an image capturing device when the image capturing device is wobbled.

Referring to FIG. 1, various image capturing devices, such as a smart phone, a tablet PC, CCTV, a Web camera (Webcam), a Pan-Tilt-Zoom (PTZ) camera, a camcorder, and a laptop, may capture a subject 15 and generate an image of the subject, which may be an animate or inanimate object.

A wobble (as used herein means any unintentional movement, vibration, or shaking that distorts an image) may occur when the image capturing device capture the subject 15. For example, due to wobble the image capturing device 11 at a first time t1 and the image capturing device 12 at a second time t2 may capture the subject 15 at different positions even though the subject has not moved. Accordingly, even though the subject 15 is stationary, the image captured at the first time t1 and the image captured at the second time t2 may be different from each other. For example, even though the subject 15 is stationary, as shown in FIG. 1, a feature point of the subject 15 in the captured image is located at a first position P1 of an image at the first time t1, but it is located at a second position P2 of an image at the second time t2.

Figure 2:
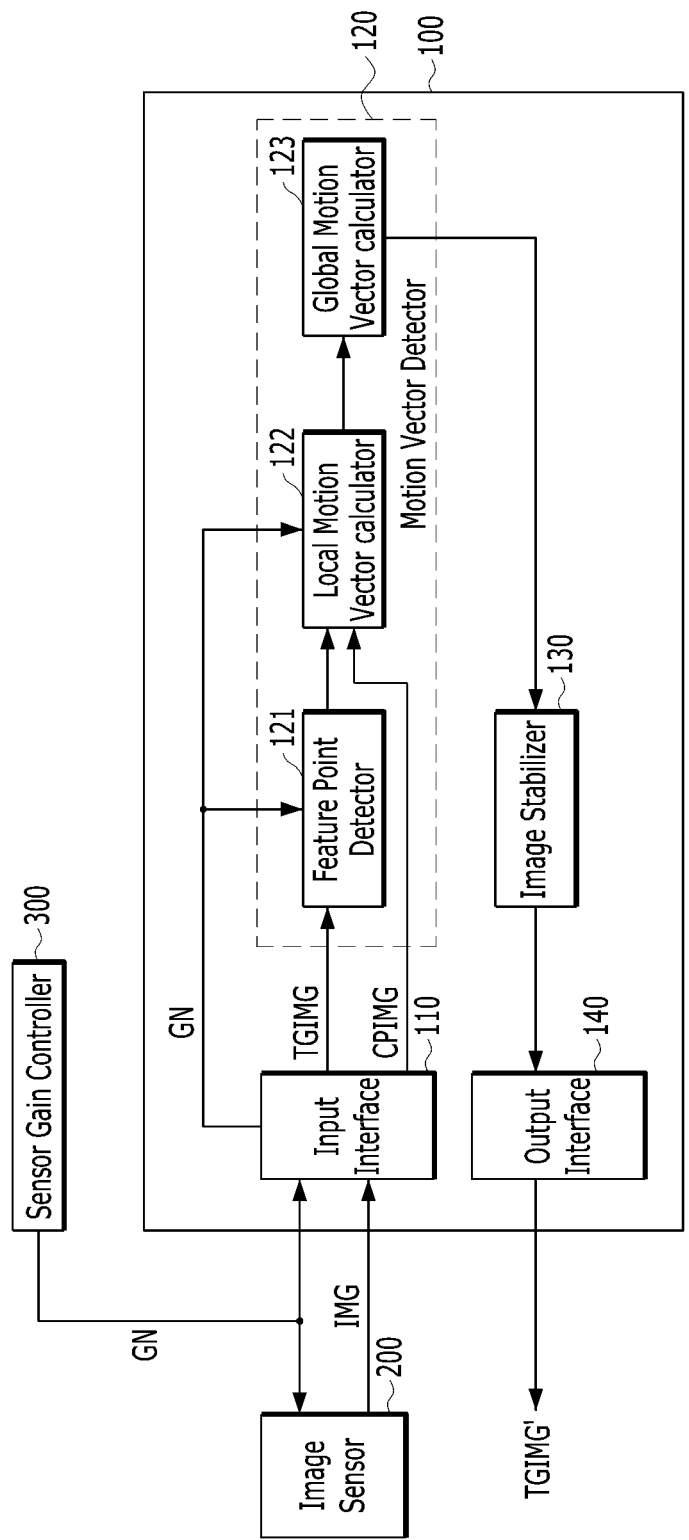
FIG. 2 is a block diagram of an exemplary embodiment of an image processing device constructed according to the principles of the invention.

FIG. 2 is a block diagram of an exemplary embodiment of an image processing device constructed according to the principles of the invention.

Referring to FIG. 2, an image processing device 100 is coupled to an image sensor 200. The image sensor 200 generates a plurality of images IMG that are captured in chronological order, the generated images IMG are provided to the image processing device 100. The image sensor 200 may convert optical signals to electrical signals using any known technology such as CMOS (Complementary Metal Oxide Semiconductor), and may digitize the electrical signals to generate each of the images IMG.

The image sensor 200 is further coupled to a sensor gain controller 300. The image sensor 200 may receive a gain GN provided from the sensor gain controller 300. The sensor gain controller 300 may adjust the gain value GN, in which the electrical signals are converted to the images IMG, to control the brightness of the images IMG. The gain GN of the image sensor 200 provided by the sensor gain controller 300 may be adjusted in various manners. For example, the sensor gain controller 300 may increase the gain GN of the image sensor 200 to increase the brightness of the image when at least parts of the images to be captured are perceived as relatively dark. For instance, the sensor gain controller 300 may increase the gain GN of the image sensor 200 to increase the brightness of the image in response to a user's selection received through, for example, a user interface 1400 shown in FIG. 14.

In case where the gain GN of the image sensor 200 increases, the brightness of the images IMG increases, but the noise included in the images IMG may also increase. According to the exemplary embodiments of the invention, the sensor gain controller 300 provides the image processing device 100 with a gain GN that is utilized to generate the images IMG. The image processing device 100 utilizes the gain GN to correct for wobble in the images IMG.

The image processing device 100 includes an input interface 110, a motion vector detector 120, an image stabilizer 130, and an output interface 140.

The input interface 110 communicates signals between the image processing device 100 and the image sensor 200. The input interface 110 may receive the images IMG from the image sensor 200, and may transfer the received images IMG to the motion vector detector 120.

Although not shown in FIG. 2, a buffer memory coupled to the image processing device 100 and the image sensor 200 may be further provided. In this case, the image sensor 200 may store the generated images IMG in the buffer memory, and the input interface 110 of the image processing device 100 may access the buffer memory to read the images IMG.

According to the illustrated embodiment, the image processing device 100 may further include an interface receiving the gain GN of the image sensor 200 from the sensor gain controller 300. The input interface 110 may transfer the received gain GN to the motion vector detector 120.

The motion vector detector 120 processes the images IMG on the basis of the gain GN. The motion vector detector 120 detects feature points having feature values higher than a threshold value in an image to be corrected (hereinafter, referred to as "target image TGIMG"), and determines a global motion vector between the target image TGIMG and a comparison image CPIMG by using at least parts of the detected feature points. Here, the threshold value is adjusted depending on the value of the gain GN of the image sensor 200.

The comparison image CPIMG may be an image that is captured before capturing the target image TGIMG. For example, the target image TGIMG may be an a-th image of the images IMG generated by the image sensor 200 in chronological order, and the comparison image CPIMG may be an (a-b)-th image of the images IMG, where a is a positive integer, and b is a positive integer less than a.

The motion vector detector 120 includes a feature point detector 121, a local motion vector calculator 122, and a global motion vector calculator 123, as is known in the art. The feature point detector 121 is configured to detect feature points having feature values higher than the threshold value in the target image TGIMG. In an exemplary embodiment, the feature point detector 121 may divide the target image TGIMG into a plurality of sub blocks, select feature point candidates from each of the plurality of sub blocks, and detect one or more of the feature point candidates having feature values higher than the threshold value as feature points. The local motion vector calculator 122 may receive the gain GN through the input interface 110 and may adjust the threshold value depending on the value of the gain GN of the image sensor 200.

The local motion vector calculator 122 is configured to calculate local motion vectors of the feature points by comparing the target image TGIMG to the comparison image CPIMG. For example, the local motion vector calculator 122 may calculate the local motion vectors of the feature points by comparing each of regions of the target image TGIMG which includes feature points to the comparison image CPIMG.

The global motion vector calculator 123 is configured to calculate a global motion vector according to the local motion vectors. For example, the average of the local motion vectors may be determined as the global motion vector. However, the exemplary embodiments are not limited thereto. Various manners for calculating the global motion vector according to the local motion vectors may be utilized as is known in the art. For instance, a histogram of the local motion vectors may be calculated, and the global motion vector may be determined according to the calculated histogram.

The image stabilizer 130 corrects for wobble in the target image TGIMG based on the global motion vector. The output interface 140 outputs the corrected target image TGIMG'.

Figure 3:
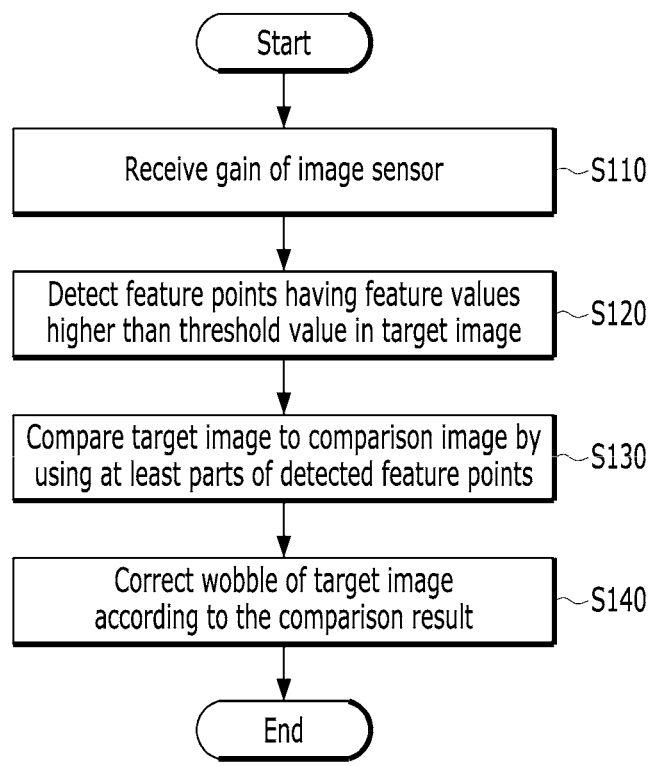
FIG. 3 is a flowchart of a method of correcting for wobble in an image at the image processing device according to an exemplary embodiment of the invention.

FIG. 3 is a flowchart of a method of correcting for wobble in an image at the image processing device according to an exemplary embodiment of the invention.

Referring to FIGS. 2 and 3, at step S110, a gain GN of the image sensor 200 is received from the sensor gain controller 300. The images IMG are further received from the image sensor 200.

At step S120, feature points having feature values higher than a threshold value are detected in the target image TGIMG. In an exemplary embodiment, the feature point detector 121 may detect a plurality of feature point candidates, and detect one or more feature point candidates having feature values higher than the threshold value as the feature points.

The feature point candidates may be selected in various manners. In an exemplary embodiment, the target image TGIMG may be divided into a plurality of sub blocks, a point having the highest feature value among points of each sub block may be selected as the feature point candidate, and feature point candidates having a feature value higher than the threshold value among the selected feature point candidates may be detected as the feature points.

In an exemplary embodiment, the feature value of each point may be a contrast level between a corresponding point and points adjacent thereto. A point having the highest contrast level in each sub block, for example, a point positioned on edges of an object in the image, a point positioned on the intersection of the edges, or the like, may be selected as the feature point candidate of the corresponding sub block. A point that is not positioned on the edges, for example, a point positioned on a background in the image, may be selected as the feature point candidate. In this regard, U.S. Pat. No. 9,466,095 is hereby incorporated by reference for all purposes as if fully set forth herein.

The noise included in the target image TGIMG increases as the gain GN of the image sensor 200 increases. The feature values of the points included in the target image TGIMG may decrease as the noise increases. For example, the sensor gain controller 300 may increase the gain GN of the image sensor 200 when the image is perceived as being relatively dark by an illuminance sensor or when a user input commanding the increase of the gain GN is received through a user interface. In this manner, the target image TGIMG is bright, but the contrast levels of the edge of the object included in the target image TGIMG may decrease with increase in the noise. If a point having a relatively low feature value is selected as a feature point and a local motion vector is calculated using the feature point, the possibility that the local motion vector reflects the wobble direction of the image may be reduced. That is, the local motion vector may have low reliability in reflecting the wobble direction of the image. To this end, the low reliability of the local motion vectors may mean that the reliability of a global motion vector calculated based on the local motion vectors is relatively low.

The noise included in the target image TGIMG decreases as the gain GN of the image sensor 200 decreases. In response to the decrease of the noise, the feature values of points included in the target image TGIMG may increase. For example, the sensor gain controller 300 may reduce the gain GN of the image sensor 200 when the image is perceived as relatively bright by the illuminance sensor or when a user input commanding the decrease of the gain GN is received through the user interface. In this manner, the target image TGIMG which is relatively clear may be obtained, and therefore the contrast levels of the edge of the object included in the target image TGIMG may increase. As such, if a relatively large number of local motion vectors are calculated using a relatively large number of feature points and a global motion vector is calculated based on the increased number of the local motion vectors, the reliability of the global motion vector may be improved.

According to the exemplary embodiments and the principles of the invention, points having the feature values higher than the threshold value are detected as the feature points in the target image TGIMG, with the threshold value increasing as the gain GN of the image sensor 200 increases. According to the increase in the threshold value, the detected feature points may have relatively high feature values, local motion vectors may be calculated by using the feature points having the high feature values. For instance, when perceived as relatively dark, a more definite edge in the target image TGIMG may be adopted as the feature points. Accordingly, the reliability of the local motion vectors may increase, and the reliability of the global motion vector that is calculated based on the local motion vectors may also increase. As a result, the image processing device 100 may correct for wobble in the image with high reliability.

The gain GN of the image sensor 200 may be utilized to generate the images IMG and may be a factor that determines the brightness or noise of the images IMG. Accordingly, the feature points may be selected efficiently by adjusting the threshold value according to the gain GN of the image sensor 200. If the image capturing device includes an illuminance sensor and the threshold value is adjusted using an illuminance value provided from the illuminance sensor, given that the lens of the image sensor 200 is located at a physically different position from the illuminance sensor and the gain GN of the image sensor 200 does not necessarily have to be adjusted according to the illuminance value, the brightness and noise of the images IMG may vary independently of the level of the illuminance value. If feature points are selected using a threshold value that is adjusted according to the illuminance value and local motion vectors are calculated using the feature points, the possibility that the local motion vectors reflect the wobble direction may decrease. On the other hand, in the image processing device 100 constructed according to the exemplary embodiments, the threshold value is adjusted using the gain GN of the image sensor 200, which is a factor that determines the brightness or noise of the images IMG, and thus the feature points may be selected efficiently.

At step S130, the target image TGIMG and the comparison image CPIMG is compared in the Local Motion Vector Calculator by using at least parts of the detected feature points. The local motion vector calculator 122 may calculate the local motion vectors of the feature points, and may determine the global motion vector according to the local motion vectors, as known in the art.

At step S140, the wobble of the target image TGIMG may be corrected according to the comparison result. The image stabilizer 130 may correct the wobble of the target image TGIMG on the basis of the global motion vector.

Figure 4:
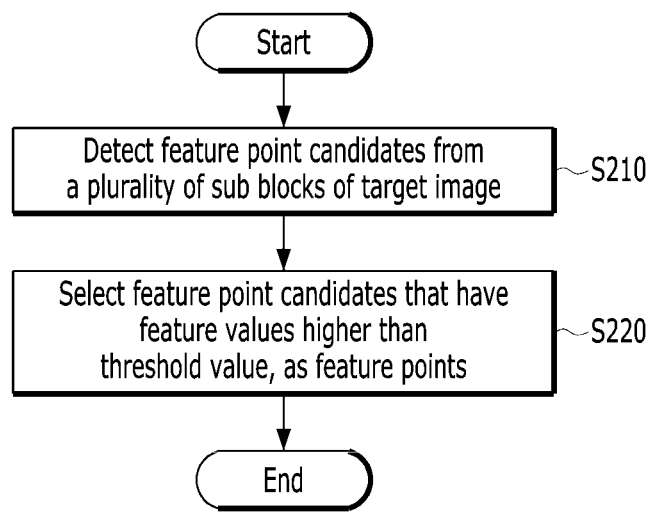
FIG. 4 is a flowchart of an exemplary embodiment of step S120 of FIG. 3.
Figures 5A, 5B:
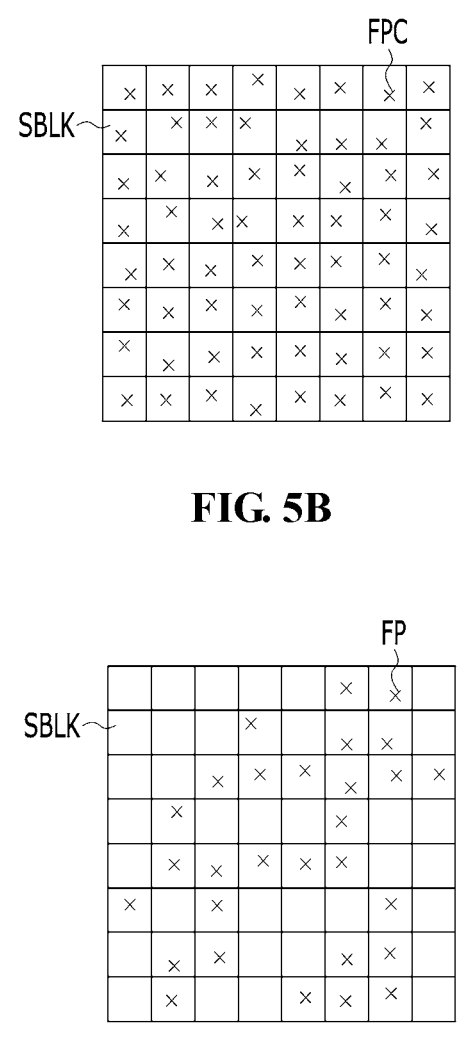
Figure 6:
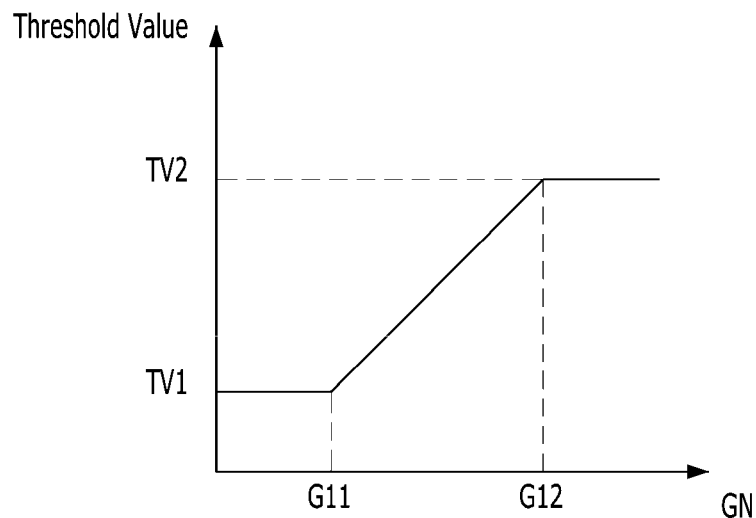
FIG. 6 is a graph illustrating the relationship between a gain of an image sensor and a threshold voltage according to the principles of the invention.

FIG. 4 is a flowchart of an exemplary embodiment of step S120 of FIG. 3. FIG. 5A is a schematic diagram for illustrating feature point candidates that are detected in a target image. FIG. 5B is a schematic diagram for illustrating feature points selected from the feature point candidates. FIG. 6 is a graph illustrating the relationship between a gain of an image sensor and a threshold voltage according to the principles of the invention.

Referring to FIGS. 2 and 4, at step S210, feature point candidates are detected from a plurality of sub blocks of the target image TGIMG. Referring to FIG. 5A, the target image TGIMG is divided into the plurality of sub blocks SBLK. Feature values, such as contrast levels, of points of each sub block may be calculated, and a point having the highest feature value among the calculated feature values may detected as a feature point candidate FPC.

Referring back to FIGS. 2 and 4, at step S220, one or more feature point candidates that have feature values higher than the threshold value are selected as feature points. Referring to FIG. 5B, feature point candidates having feature values equal to or lower than the threshold value are shown as being removed. Feature point candidates having feature values higher than the threshold value are selected as the feature points FP.

The threshold value may increase as the gain GN of the image sensor 200 increases. Referring to FIG. 6, the threshold value is a first value TV1 when the gain GN of the image sensor 200 is lower than a first level G11, the threshold value increases between the first value TV1 and a second value TV2 as the gain GN of the image sensor 200 increases when the gain GN is between the first level G11 and a second level G12, the threshold value is the second value TV2 when the gain GN of the image sensor 200 is higher than the second level G12. As such, the threshold value is adaptively adjusted according to the gain GN of the image sensor 200.

Figure 7:
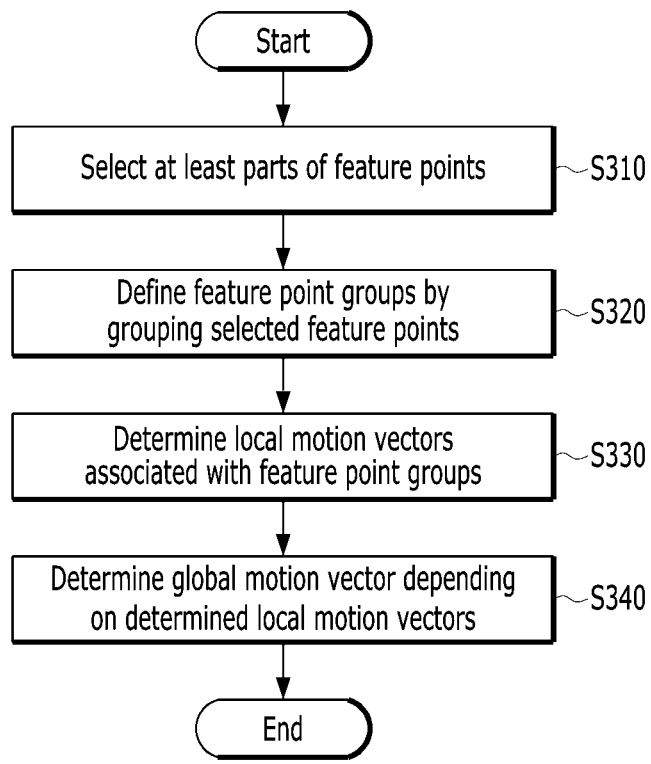
FIG. 7 is a flowchart of a method of comparing a target image and a comparison image according to an exemplary embodiment of the invention.

FIG. 7 is a flowchart of a method of comparing a target image and a comparison image according to an exemplary embodiment of the invention.

Referring to FIGS. 2 and 7, at step S310, at least parts of the feature points are selected. This will be described in detail with reference to FIGS. 8 to 11.

At step S320, feature point groups are defined by grouping the selected feature points. Here, the number of the feature points included in the feature point group is adjusted according to the gain GN of the image sensor 200. The feature point group may include feature points adjacent to each other.

At step S330, local motion vectors associated to the feature point groups are determined, respectively.

Step S310 to step S330 may be performed by the local motion vector calculator 122. The local motion vector calculator 122 may select at least parts of the feature points, receive the gain GN of the image sensor 200 through the input interface 110 to group the selected feature points, and determine the local motion vectors for the feature point groups, respectively.

At step S340, a global motion vector is determined depending on the determined local motion vectors.

Given that the noise included in the target image TGIMG increases as the gain GN of the image sensor 200 increases, some of the local motion vectors of the individual feature points may have relatively low reliability. According to the exemplary embodiments and the principles of the invention, the local motion vector is calculated for the feature point group that includes one or more feature points, and the feature points may be grouped such that the number of the feature points included in the feature group increases as the gain GN of the image sensor 200 increases. Accordingly, each of the local motion vectors may have high reliability in reflecting a wobble direction of the image, and the global motion vector calculated based on the local motion vectors may also have high reliability.

Figure 8:
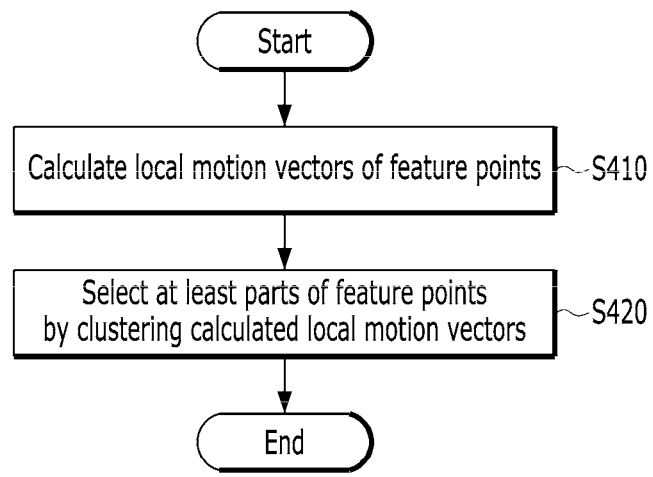
FIG. 8 is a flowchart of an exemplary embodiment of step S310 of FIG. 7.
Figure 9:
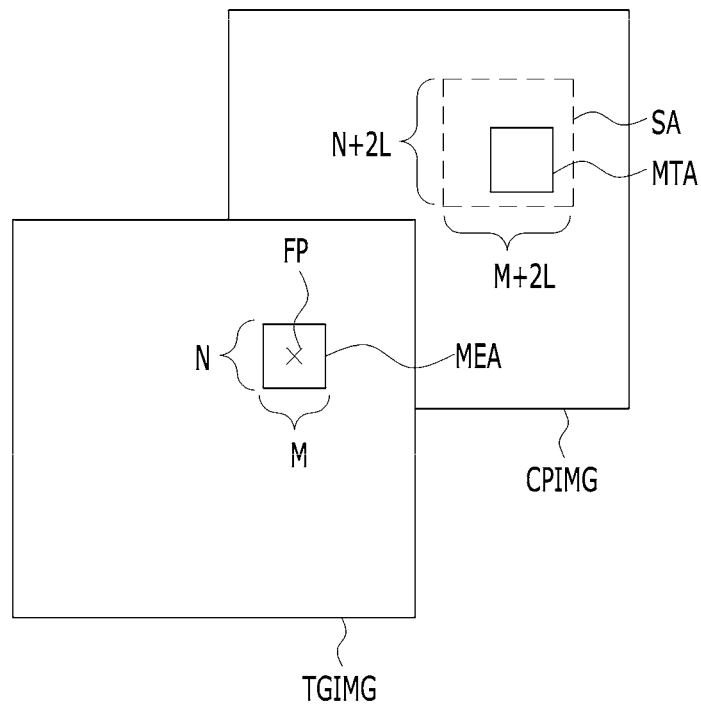
FIG. 9 is a conceptual view for illustrating processes of calculating the local motion vectors of step S410 of FIG. 8.
Figure 10:
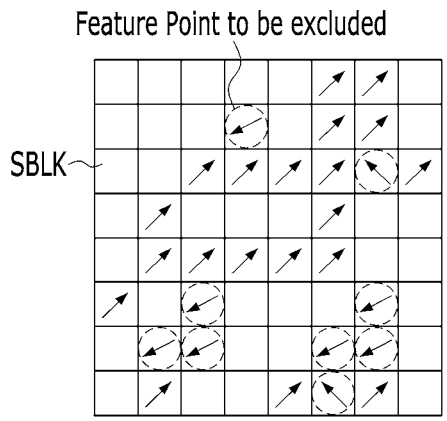
FIG. 10 is a conceptual view for illustrating processes of selecting feature points by using the local motion vectors of step S420 of FIG. 8.

FIG. 8 is a flowchart of an exemplary embodiment of step S310 of FIG. 7. FIG. 9 is a conceptual view for illustrating processes of calculating the local motion vectors of step S410 of FIG. 8. FIG. 10 is a conceptual view for illustrating processes of selecting feature points by using the local motion vectors of step S420 of FIG. 8.

Referring to FIG. 8, at step S410, local motion vectors of the feature points are calculated by comparing the target image TGIMG and the comparison image CPIMG shown in FIG. 2. Referring to FIG. 9, one feature point FP of the target image TGIMG is shown for descriptive convenience. In the target image TGIMG, a rectangle centering on the feature point FP is defined as a motion estimation area MEA. The motion estimation area MEA may have a size of M*N, where M and N each may refer to the number of points (or pixels). In the comparison image CPIMG, a searching area SA is defined. The searching area SA may overlap the motion estimation area MEA and have a size larger than the motion estimation area MEA. For example, the searching area SA may have a size of (M+2L)*(N+2L), where L may refer to the number of points. Each of portions of the searching area SA may be compared to the motion estimation area MEA, and a portion of the searching area SA that is similar to the motion estimation area MEA may be determined as a matched area MTA. A correlation value between each of the portions of the searching area SA and the motion estimation area MEA is calculated, and a portion having the lowest correlation value among the portions of the searching area SA may be determined as the matched area MTA. For example, SAD (Sum of Absolute Difference) between each of the portions of the searching area SA and the motion estimation area MEA may be calculated as the correlation value based on the following equation 1.

$$SAD_{x,y}(u,v) \equiv \sum_{i=0}^{M-1}\sum_{j=0}^{N-1} |I_t(x+i, y+j) - I_{t-1}(x+u+i, y+v+j)| \quad \text{Eq. 1}$$

$$(-L \le u \le L, -L \le v \le L)$$

Referring to equation 1, x and y are the coordinates of a feature point FP in the motion estimation area MEA, and u and v are the displacement for the searching area SA. $I_t(x+i, y+j)$ is a function value that takes a certain factor of the coordinate (x+i, y+j) of a current image (or target image), and $I_{t-1}(x+u+i, y+v+j)$ is a function value that takes the certain factor of the coordinate (x+u+i, y+v+j) of a previous image (or comparison image). $I_t(x+i, y+j)$ and $I_{t-1}(x+u+i, y+v+j)$ may be one of various functions known in the art. $SAD_{x,y}(u, v)$ is Sum of Absolute Difference (SAD) between the motion estimation area MEA and a portion including a coordinate (x+u, y+v) of the searching portion SA. A portion of the searching area SA having the lowest SAD may be determined as the matched area MTA, a corresponding displacement u and v may be determined as a local motion vector of the feature point FP.

That is, the local motion vector of the feature point FP may be determined according to the coordination corresponding to the determined matched area MTA, and local motion vectors of the other feature points included in the target image TGIMG may be calculated in the same way as described above.

Referring back to FIG. 8, at step S420, the calculated local motion vectors are clustered to select at least parts of the feature points. A local motion vector different from plural local motion vectors having similar direction and magnitude may correspond to a motion of a moving object existed in the target image TGIMG, or to an inaccurate motion estimate due to noise. The individual motion of the object or the inaccurate motion estimate may not be related to a wobble direction of the image. For this reason, the plural local motion vectors having similar direction and magnitude may be selected, and a local motion vector different therefrom may not be selected. Referring to FIG. 10, a local motion vector of each feature point of the target image TGIMG is shown. The local motion vectors may be clustered to select a cluster having the largest number of local motion vectors. In FIG. 10, local motion vectors that are excluded from a cluster of the largest number of local motion vectors having similar direction and magnitude are highlighted with dotted circles. The local motion vectors highlighted with dotted circles may be unselected and the remaining local motion vectors may be selected.

Figure 11:
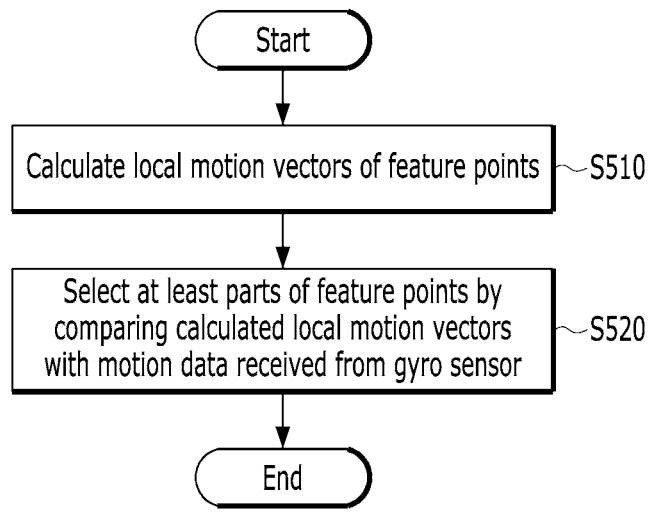
FIG. 11 is a flowchart of another exemplary embodiment of step S310 of FIG. 7.

FIG. 11 is a flowchart of another exemplary embodiment of step S310 of FIG. 7.

Referring to FIG. 11, at step S510, local motion vectors of the feature points are calculated. Step S510 may be described in the same way as step S410 of FIG. 8. Hereinafter, overlapping description will be omitted to avoid redundancy.

At step S520, at least parts of the feature points are selected by comparing the calculated local motion vectors to motion data received from a gyro sensor. The image capturing device shown in FIG. 1 may further include the gyro sensor configured to detect a physical motion (e.g., wobble) of the image capturing device. The motion data may include data obtained by converting angular velocity measured by the gyro sensor into pixel data of the image. The image processing device 100 shown in FIG. 2 may communicate the gyro sensor to receive the angular velocity, and convert the received angular velocity into the motion data.

According to the illustrated embodiment, local motion vectors in a range similar to direction and magnitude of the motion data may be selected. The local motion vectors that are not in the range similar to the direction and magnitude of the motion data may be unselected from the calculation of the global motion vector.

Figure 12:
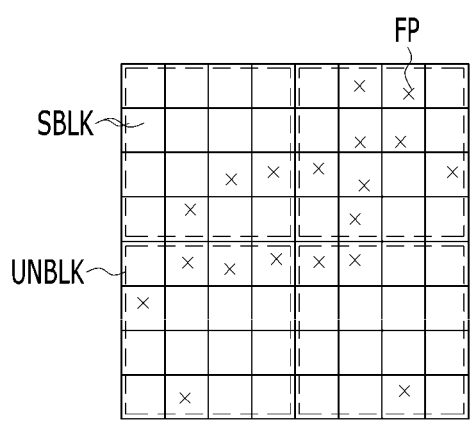
FIG. 12 is a schematic diagram for illustrating an exemplary embodiment of grouping feature points of step S320 of FIG. 7.

FIG. 12 is a schematic diagram for illustrating an exemplary embodiment of grouping feature points of step S320 of FIG. 7.

Referring to FIG. 12, feature point groups including feature points FP are shown as being divided with dotted boxes. The feature points FP included in one dotted box may form a feature point group. In an exemplary embodiment, each feature point group may include feature points FP adjacent to each other. In FIG. 12, the sub blocks SBLK may be grouped into unit block UNBLK, feature points FP included in the unit block UNBLK may be defined as the feature point group. However, the exemplary embodiments are not limited thereto, and the feature points FP may be grouped in various manners.

According to the exemplary embodiments and the principles of the invention, the local motion vectors are determined for feature point groups, respectively, to determine the global motion vector, the number of the feature points FP included in one feature group increases as the gain GN of the image sensor 200 increases. In case where the feature points FP included in one unit block UNBLK are defined as the feature point group, the size of the unit block UNBLK may increase as the gain GN of the image sensor 200 increases. That is, the number of the sub blocks SBLK included in each of the unit blocks UNBLK may be adjusted depending on the gain GN of the image sensor 200. Accordingly, each of the local motion vectors may have a high reliability in reflecting a wobble of the image, and thus the global motion vector calculated according to the local motion vectors may also have a high reliability.

Figure 13:
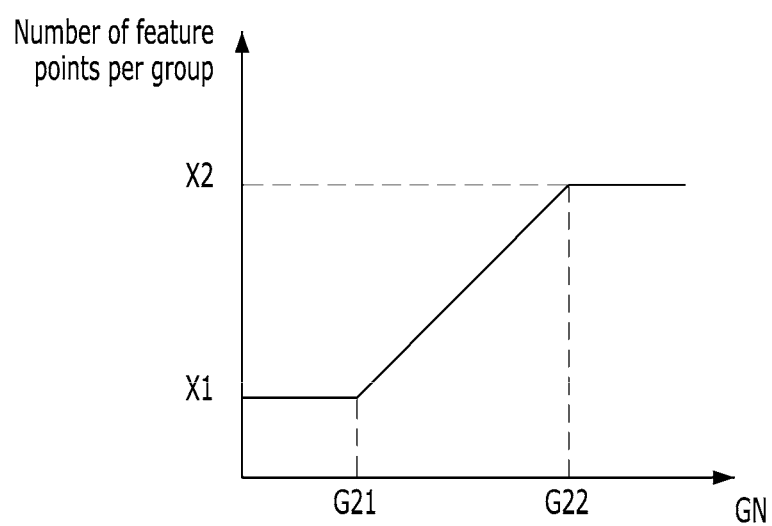
FIG. 13 is a graph illustrating the relationship between a gain of an image sensor and the number of the feature points included in a feature point group according to the principles of the invention.

FIG. 13 is a graph illustrating the relationship between a gain of an image sensor and the number of the feature points included in a feature point group according to the principles of the invention.

Referring to FIG. 13, the number of the feature points included in the feature point group is: a first value X1 when the gain GN of the image sensor 200 is lower than a first level G21; and a second value X2 when the gain GN of the image sensor 200 is higher than a second level G22. The number of the feature points included in the feature point group increases between the first value X1 and the second value X2 as the gain GN of the image sensor 200 increases between the first level G21 and the second level G22. As such, the number of the feature points included in the feature point group is adaptively adjusted depending on the gain GN of the image sensor 200.

In an exemplary embodiment, the local motion vector of the feature point group may be determined as a local motion vector of a feature point having the lowest SAD among the feature points of the feature point group. In this case, given that the SAD for each of the feature points has already been calculated through Equation 1, the local motion vector of the feature point group may be determined in a relatively short time. In another exemplary embodiment, the local motion vector of the feature point group may be determined as an average of the local motion vectors of the feature points included in the feature point group.

In still another exemplary embodiment, SAD of the feature point group may be calculated based on the following equation 2.

$$SAD^G(u,v) \equiv \frac{SAD_{x1,y1}(u,v) + SAD_{x2,y2}(u,v) + \ldots + SAD_{xk,yk}(u,v)}{k} \quad \text{Eq. 2}$$

$$(-L \le u \le L, -L \le v \le L)$$

Referring to equation 2, SAD of the feature point group $SAD^G(u,v)$ may be recalculated by averaging $SAD_{x,y}(u,v)$ that is calculated for each of k feature points [(x1, y1), (x2, y2), (x3, y3), ..., (xk, yk)] of the feature point group by taking the displacement u and v as inputs. k is the number of the feature points included in the feature point group. Performing this calculation repeatedly, the displacement u and v that outputs the lowest $SAD^G(u,v)$ may be determined as the local motion vector of the feature point group.

Figure 14:
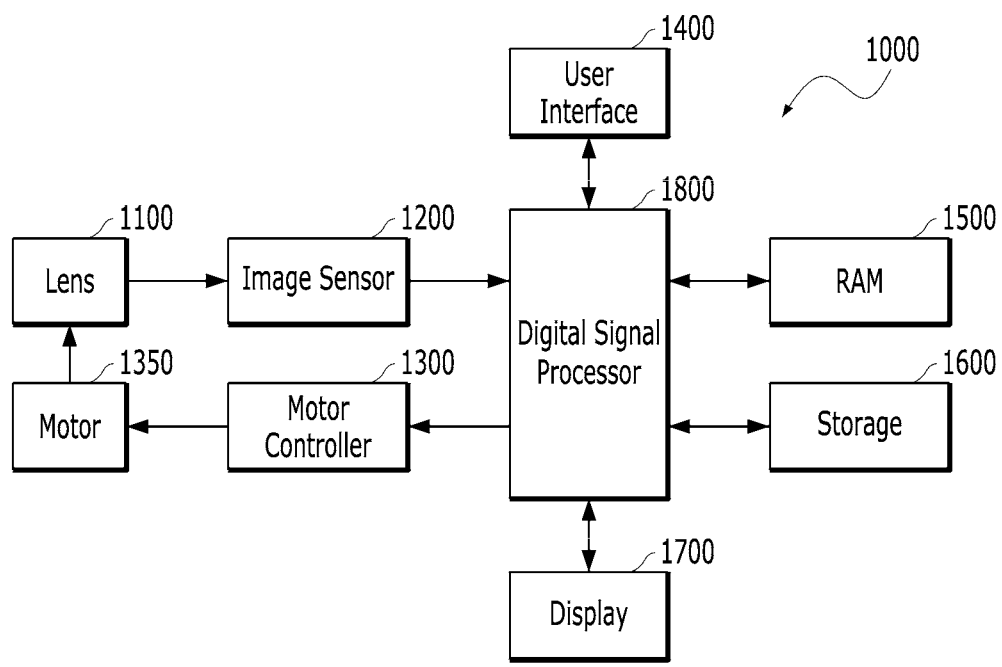
FIG. 14 is a block diagram of an exemplary computer system suitable for implementing exemplary embodiments of the image capturing device of the invention.

FIG. 14 is a block diagram of an exemplary computer system suitable for implementing exemplary embodiments of the image capturing device.

Referring to FIG. 14, a computer system 100 includes a lens 1100, an image sensor 1200, a motor controller 1300, a motor 1350, a user interface 1400, a RAM 1500, a storage 1600, a display 1700, and a digital signal processor 1800.

The lens 1100 receives an optical signal from a subject. The optical signal received through the lens 1100 is converted into an electrical signal. The image sensor 1200 may digitize the electrical signal with a proper gain to generate an image. For example, the image sensor 1200 may include an analog-to-digital converter.

The motor controller 1300 is configured to control an operation of the motor 1350 in response to a control of the digital signal processor 1800, the motor 1350 is configured to operate the lens 1100.

The user interface 1400 detects a user's input for controlling an operation of the computer system 1000, and generates a corresponding command. The user interface 1400 may include an input device able to detect information caused by the user's input, such as a key pad, a mouse, a finger scan sensor, a dome switch, a touch pad, a jog wheel, and the like.

The RAM 1500 may include at least one of various types of memories, such as SRAM (Static RAM), DRAM (Dynamic RAM), SDRAM (Synchronous DRAM), and the like. The RAM 1500 may be provided as a working memory of the digital signal processor 1800. The digital signal processor 1800 may include a working memory that is seperated from the RAM 1500. For example, the RAM 1500 may temporarily store images received from the image sensor 1200, and may provide the digital signal processor 1800 with the stored images.

The storage 1600 may include various types of storage devices able to store data even when the power is off, such as a flash memory, a hard disk, and the like.

The display 1700 displays information processed by the computer system 1000 in response to the control of the digital signal processor 1800. For instance, the display 1700 displays the image TGIMG' shown in FIG. 2 corrected by the digital signal processor 1800.

The digital signal processor 1800 is configured to control overall operations of the computer system 1000. The digital signal processor 1800 may operate in response to an input command received through the user interface 1400, and may perform the functions of the image processing device 100 and the sensor gain controller 300 described with reference to FIG. 2. The digital signal processor 1800 may include a processor for executing one or more applications performing commands causing operations or steps described with reference to FIGS. 2, 3, 4, 7, 8, and 11. The digital signal processor 1800 may load program codes corresponding to the applications and execute the program codes to operate the applications. The program codes and commands may be stored in the storage 1600.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An image processing device to correct for wobble of an image, the image processing device comprising:
    an input interface to communicate with an image sensor; and
    a motion vector detector to process first and second images captured by the image sensor using a single gain value,
    wherein the motion vector detector is configured to:
    receive the first and second images from the image sensor through the input interface;
    obtain the single gain value of the image sensor;
    detect, in the first image, feature points having feature values higher than a threshold value; and
    compare the first image to the second image by using at least parts of the feature points to determine a global motion vector of the first image, the threshold value being adjustable depending on the single gain value of the image sensor.

2. The image processing device of claim 1, wherein the motion vector detector is configured to increase the threshold value as the gain value of the image sensor increases.

3. The image processing device of claim 2, wherein:
    the threshold value is a first value when the gain value of the image sensor is lower than a first level;
    the threshold value is a second value higher than the first value when the gain value of the image sensor is higher than a second level that is higher than the first level; and
    the threshold value increases between the first value and the second value as the gain value of the image sensor increases when the gain value of the image sensor is between the first level and the second level.

4. The image processing device of claim 1, wherein the feature values are contrast levels.

5. The image processing device of claim 1, wherein:
    the first image comprises a plurality of sub blocks; and
    the motion vector detector is configured to detect feature point candidates in the plurality of sub blocks, respectively, and to select one or more of the feature point candidates having feature values higher than the threshold value as the feature points.

6. The image processing device of claim 1, further comprising:
    an image stabilizer to correct the first image in response to a signal from the global motion vector.

7. The image processing device of claim 1, wherein the motion vector detector is configured to generate signals representative of local motion vectors of feature point groups of the first image by comparing them to the second image, and to generate signals representative of the global motion vector based upon the local motion vectors, and wherein the feature point groups are defined by grouping the at least parts of the feature points.

8. The image processing device of claim 7, wherein the motion vector detector is configured to adjust the number of feature points included in each of the feature point groups depending on the gain value of the image sensor.

9. The image processing device of claim 8, wherein the number of feature points included in each of the feature point groups increases as the gain value of the image sensor increases.

10. The image processing device of claim 8, wherein:
    the number of feature points is a first value when the gain value of the image sensor is lower than a first level;
    the number of feature points is a second value higher than the first value when the gain value of the image sensor is higher than a second level that is higher than the first level; and
    the number of feature points increases between the first value and the second value as the gain value of the image sensor increases when the gain value of the image sensor is between the first level and the second level.

11. A method for correcting wobble in an image, the method comprising steps of:
    receiving first and second images captured by an image sensor using a single gain value;
    receiving the single gain value of the image sensor;
    detecting, in the first image, feature points having feature values higher than a threshold value; and
    comparing the first image to the second image by using at least parts of the feature points to generate signals to correct for the wobble of the first image,
    wherein the threshold value is adjustable depending on the single gain value of the image sensor.

12. The method of claim 11, wherein the threshold value increases as the gain value of the image sensor increases.

13. The method of claim 11, wherein the step of comparing the first image to the second image comprises:
    defining feature point groups by grouping the at least parts of the feature points;
    generating signals representative of local motion vectors of the feature point groups of the first image by comparing to the second image; and
    generating signals representative of a global motion vector of the first image based upon the local motion vectors.

14. The method of claim 13, wherein the number of feature points included in each of the feature point groups is adjusted depending on the gain value of the image sensor.

15. The method of claim 14, wherein the number of feature points included in each of the feature point groups increases as the gain value of the image sensor increases.

16. An image processing device to correct for wobble in an image, the image processing device comprising:
    an input interface to communicate with an image sensor; and
    a motion vector detector to process first and second images captured by the image sensor using a single gain value,
    wherein the motion vector detector is configured to:
    receive the first and second images from the image sensor through the input interface;
    obtain the single gain value of the image sensor; and
    generate signals representative of a global motion vector of the first image based upon local motion vectors of feature point groups of the first image by comparing them to the second image, the feature point groups being defined by grouping at least parts of feature points included in the first image, wherein the motion vector detector is configured to adjust the number of feature points included in each of the feature point groups depending on the single gain value of the image sensor.

17. The image processing device of claim 16, wherein the number of feature points included in each of the feature point groups increases as the gain value of the image sensor increases.

18. The image processing device of claim 16, wherein:
the feature points included in the first image have feature values higher than a threshold value,
the threshold value increases as the gain value of the image sensor increases.

19. The image processing device of claim 18, wherein:
the first image includes a plurality of sub blocks; and
the motion vector detector is configured to detect feature point candidates in the plurality of sub blocks, respectively, and to select one or more of the feature point candidates having feature values higher than the threshold value as the feature points included in the first image.

20. The image processing device of claim 18, wherein the threshold value increases as the gain value of the image sensor increases.

* * * * *